O. Turner,
Harness,
N° 44,680. Patented Oct. 11, 1864.
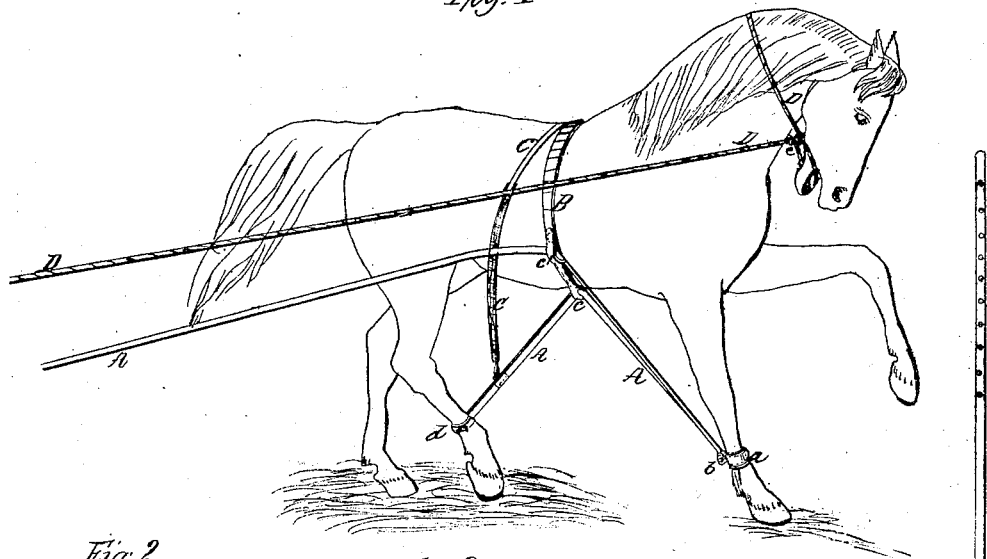
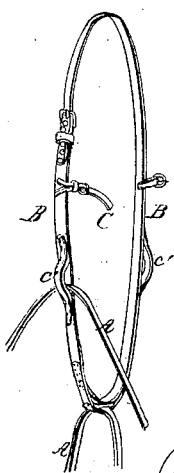
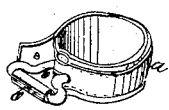
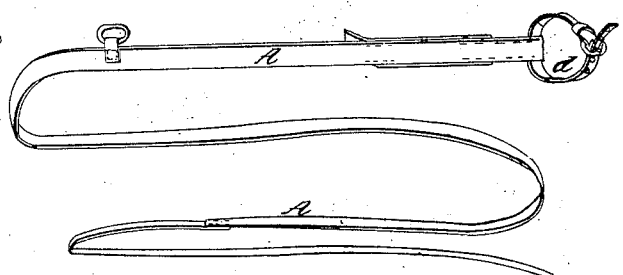

UNITED STATES PATENT OFFICE.

OREN TURNER, OF CLINTON, WISCONSIN.

APPARATUS FOR HANDLING VICIOUS HORSES.

Specification forming part of Letters Patent No. 44,680, dated October 11, 1864.

*To all whom it may concern:*

Be it known that I, OREN TURNER, of Clinton, Rock county, State of Wisconsin, have invented a new and Improved Harness for Handling Vicious Horses; and I do hereby declare that the following is a full, clear, and exact description thereof, reference being had to the accompanying drawings, making a part of this specification, in which—

Figure 1 is a view showing the application of my invention to a horse. Fig. 2 is a view of the girth. Fig. 3. is a perspective view of the front ankle-strap. Fig. 4 is the check-rein with the ankle-strap for the hind leg attached to it. Fig. 5 is an elastic strap for supporting the check-rein.

Similar letters of reference indicate corresponding parts in the several figures.

The object of this invention is to construct a harness for correcting vicious habits in horses and other draft-animals, in such manner that one person can easily teach a young colt to obey the word of command, "break it down to harness," and also check a horse should he attempt to run away, or kick, and, if necessary, throw the animal down without danger of injuring him, all as will be hereinafter described.

To enable others skilled in the art to make and use my invention, I will describe its construction and operation.

In the accompanying drawings I have represented my improved harness applied to a horse, which will show the manner of using it. This harness consists of a fetlock-strap, $a$, which is provided with a buckle, so that it can be readily applied to or removed from the horse. This strap has also a staple or eye, $b$, applied to its rear part, having a rolling tube or pulley, $b'$, so arranged as to relieve the friction of the controlling-rein which passes through this edge. The controlling-rein A is a long strap—say ten feet or more long—having a fetlock-strap, $d$, secured to one end, which is provided with a buckle by means of which the strap can be readily applied to or removed from the hind leg of the horse. When the two fetlock-straps are applied to the animal, as represented in Fig. 1, the end of the controlling-rein A is passed forward through a loop, $c$, on the girth B, thence through the eye $b$ on the fetlock-strap $a$, and finally back again through one of the side loops, $c'$, on the girth. As the controlling-strap A would be liable to get entangled with the hind leg of the horse if allowed to fall down loosely, I have applied an elastic strap, C, to this controlling-rein and attached it to the girth, in such manner that the said rein will be drawn up out of the way of the horse's hind feet in walking, and prevented under all circumstances from becoming entangled therewith. The strap C being made of an elastic material in part, it will yield and allow the rein A to accommodate itself to the ordinary movements of the horse. It will be seen from this description and arrangement of my harness that by means of a single rein, A, held in the hand at a safe distance from a horse, a person can have complete control over the movements of the animal, and that when desirable he can throw the animal upon his back by simply drawing the rein tight, and thus bringing the hind and fore feet together. When a horse is subject to kicking, his hind leg can be drawn completely up to the girth, thus rendering it impossible for him to lift the other hind leg without falling. When the controlling-rein is drawn tolerably tight, not sufficiently so, however, to prevent the animal from walking, he can neither kick nor paw. It will require the exercise of some judgement in using my improved harness upon very wild animals, when it is desired to bring them under subjection, but any person having experience in the management of horses can soon acquire all the instruction necessary to tame the most vicious animal.

The rope D, which passes around the neck of the horse, through his mouth, and thence through a loop, at $e$, forms a pulley purchase for the purpose of teaching a colt or vicious horse the word "ho," or for teaching him to come to you when commanded to do so.

The advantage of the rope D over a bit is that the pressure comes on the lips and gums of the horse's mouth in using the former, while with the latter the pressure is upon the teeth, the bit consequently does not make the impression that is made by the cord.

The use of the cord or rope A does not answer the purpose of breaking a horse from running away or kicking, particularly when "hitched" up; but by my arrangement of a controlling strap or rein, A, the animal can be instantly thrown down if he should attempt to kick or to run off.

Having thus described my invention, what I claim as new, and desire to secure by Letters Patent, is—

1. A harness adapted for correcting vicious habits in animals, which consists of a fetlock-strap, $a$, controlling-rein A, fetlock-strap $d$, and girth B, applied and operating substantially as described.

2. The elastic supporting-strap C, in combination with the controlling-strap A, when the latter is arranged substantially as and for the purposes described.

3. The combination of the controlling-rein A, fetlock-straps $a$ and $d$, and looped girth B, with a supporting-straps, C, substantially as and for the purposes described.

4. The construction of the fetlock-strap $a$, for the front foot, with a pulley, $b'$, applied to it in such a manner as to allow the controlling-strap to slip freely through it in managing the horse, substantially as described.

Witness my hand in matter of my application for a patent for improved apparatus for handling vicious horses and colts.

OREN TURNER.

Witnesses:
LEVI ALDEN,
DANIEL RADWAY.